106. COMPOSITIONS, COATING OR PLASTIC

UNITED STATES PATENT OFFICE.

ROBERT HACKING, OF WEST BRIDGFORD, NOTTINGHAM, HARRY HILL, OF OLLERTON, AND HENRY WALKER HILL, OF NOTTINGHAM, ENGLAND.

MEANS FOR LAYING DUST AND THE LIKE ON AND MAKING ROADS.

980,513.     Specification of Letters Patent.     Patented Jan. 3, 1911.

No Drawing.     Application filed November 8, 1909. Serial No. 526,837.

*To all whom it may concern:*

Be it known that we, ROBERT HACKING, HARRY HILL, and HENRY WALKER HILL, subjects of the King of Great Britain and Ireland, residing, respectively, at No. 23 Chestnut Grove, West Bridgford, Nottingham, Thoresby Park, Ollerton, and No. 37 Lenton road, Nottingham, all in the county of Nottingham and Kingdom of England, have invented certain new and useful Improvements in the Means of Laying Dust and the Like On and Making Roads, of which the following is a specification.

Our invention has for its objects improvements in the means of laying dust and the like on roads, also in binding the materials of which such roads are made. For this purpose we use a flux composed of silicate of soda preferably in a liquid form—and commonly known as water glass—or we may use the silicate in the form of crystals, either or both mixed with a suitable quantity of water. This mixture is heated nearly to boiling point so as to more readily combine the two ingredients together, and is then allowed to get cold; when cold we add thereto a solvent preferably spirits of turpentine so as to act as a preliminary solvent for the oil and other by-product contained in the tar to which the flux is afterward added. The spirits of turpentine so added enables the oil and other by-products in the tar to be more readily taken up by and mixed with the silicate of soda. This flux is combined of the above named ingredients in the following approximate proportions, viz:—

Water _____ 30 gallons.
    Silicate of soda _____ 120 pounds.
    Spirits of turpentine _ ½ gallon.

For distribution on the roads to lay the dust and bind the mud or the like and the materials of which such roads are made, the above named flux is mixed with tar and water—all cold in the following approximate proportions, viz:

Flux as specified above__ 30 gallons.
    Crude tar_____ 70 gallons.
    Water _____ 100 gallons.

If rectified tar be used instead of crude tar, the proportion will be about 60 gallons. The whole is then placed in the tank of a distributing cart—where it is thoroughly mixed together by suitable means—and is then sprayed on to the road in the ordinary manner by suitable distributing or spraying devices.

Tar in its crude or in its rectified state may be used equally well when mixed as described above, and the whole mixture can be distributed on the road quite cold without heating the mixture in any way.

The action of this mixture on the roads is such that as the silicate of soda has a greater affinity for the earth than tar, the silicate penetrates into the road and mixes with the lime, magnesian or muriatiferous substances and thus forms silicate of lime, which is a perfectly tenacious, insoluble and indestructible substance. This renders the surface of the road impermeable and non-absorbent.

We may use one or more suitable solvents other than spirits of turpentine, but we prefer to use spirits of turpentine on account of its rapid evaporation and great penetrative powers and comparative cheapness.

Having now particularly described and ascertained the nature of our said invention, and in what manner the same is to be performed, we declare that what we claim is:

1. A composition for surfacing roads, comprising a flux composed of silicate of soda and spirits of turpentine mixed with tar and water in the proportions specified, as set forth.

2. A composition for surfacing roads, comprising a flux composed of silicate of soda and spirits of turpentine mixed with tar and water in the proportions of thirty gallons of water, one hundred and twenty pounds of silicate of soda and one-half gallon of spirits of turpentine, to which is added from sixty to seventy gallons of tar and one hundred gallons of water, the whole being mixed and intimately combined with the recited ingredients, as set forth.

3. In a composition for surfacing roads, a mixture of tar and water, and a flux for liquefying the same, the said flux consisting of water, silicate of soda and spirits of turpentine, in substantially the proportions specified, for the purpose set forth.

In testimony whereof we have hereunto set our hands in presence of two subscribing witnesses.

ROBERT HACKING.
HARRY HILL.
H. WALKER HILL.

Witnesses:
FRANK A. DADY,
JOHN R. PENCOCK.